July 13, 1954

G. W. WEBER ET AL 2,683,850

REVERSE CURRENT PROTECTIVE SYSTEM

Filed July 31, 1953

Inventors
Gay W. Weber
Richard K. Gerlitz
by
Their Attorney

July 13, 1954

G. W. WEBER ET AL 2,683,850

REVERSE CURRENT PROTECTIVE SYSTEM

Filed July 31, 1953

Inventors
Gay W. Weber
Richard K. Gerlitz
by
Their Attorney

Patented July 13, 1954

2,683,850

UNITED STATES PATENT OFFICE 2,683,850

REVERSE CURRENT PROTECTIVE SYSTEM

Gay W. Weber, Erie, and Richard K. Gerlitz, Northeast, Pa., assignors to General Electric Company, a corporation of New York Application July 31, 1953, Serial No. 371,628

13 Claims. (Cl. 320—33)

1

This invention relates to a reverse current protective system for protecting a direct current load, including a battery, against connecting the source to the load when the source voltage is less than the voltage of the load and for disconnecting the source from the load when the load current reverses and flows from the load into the source.

In many applications, it is possible for the prime mover of a generator to run at any speed from maximum speed to zero speed. Such an application might be the axle of a railway passenger car; therefore, there are many occasions when such a prime mover is not running at a sufficient speed to cause the generator to produce the needed voltage.

An object of this invention is to provide a simple and reliable reverse polarity protective system that will prevent the connection of the source to the load until it is producing a sufficient voltage of proper polarity.

Another object is to provide a potential network that will cause a rapid current increase in a selected portion of a protective system when the voltage of the source exceeds a predetermined value.

A further object is to provide a battery charging system whereby the connecting switch will not tend to pump or oscillate when closed or opened.

In accordance with one form of this invention, a source of direct current is serially connected to an impedance and a relay having a plurality of windings. The contacts of the relay are arranged to connect the battery in a series relation with one of the relay coils when the relay is energized. A unidirectional conducting means is arranged to connect the battery in a series relation with both relay coils. As the voltage of the source increases the current in the relay coils increases until the voltage across the impedance exceeds the voltage of the battery. At this point the unidirectional conducting means will start to conduct current from the winding of the relay to the battery. This will effectively lower the impedance in series with the relay coils. A small further increase in the voltage of the source will cause the relay contacts to close. Should the source be operated so as to produce a reversed voltage the unidirectional means will not conduct current, thus preventing reduction of the impedance in series with the relay coils.

When the relay contacts close, the unidirectional conducting means ceases to conduct current, effectively increasing the impedance in series with the two relay coils. The current through the series impedance alone is just sufficient to hold the relay contacts closed. The series coil of the relay which is connected in series with the relay contacts and the battery is so wound that the current flowing from the source to the battery aids the current flowing in the impedance. Reverse current in the series coil decreases the net excitation of the relay, causing its contacts to open.

This invention will be better understood and other objects and advantages appreciated by referring to the following detailed specification taken in conjunction with the accompanying drawings in which.

Figure 1:
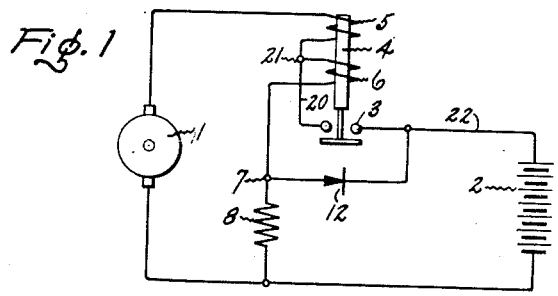
Fig. 1 is a schematic circuit diagram of the simplest embodiment of this invention.

Referring to Fig. 1, 1 represents a suitable source of direct current, such as the generator, which is arranged to be connected to the load system represented by the battery 2 having a positive terminal and a negative terminal by means of a suitable contact 3. Before the contact 3 is closed, the current from the source 1 passes through the electromagnetic operators shown as coils 5 and 6 of relay 4, junction 7 and through an impedance shown as resistor 8. As the voltage of the source 1 increases, current through the coils 4 and 5 and the resistor 8 increases. The magnitude of voltage across resistor 8 is determined primarily by the source voltage. At the point where the voltage across resistor 8 becomes greater than the battery voltage, rectifier 12 will start to conduct. This effectively reduces the resistance in series with the windings 5 and 6 of the relay 4. A further increase in voltage will cause a substantial increase in current through rectifier 12 and through the coils 5 and 6.

Figure 2:
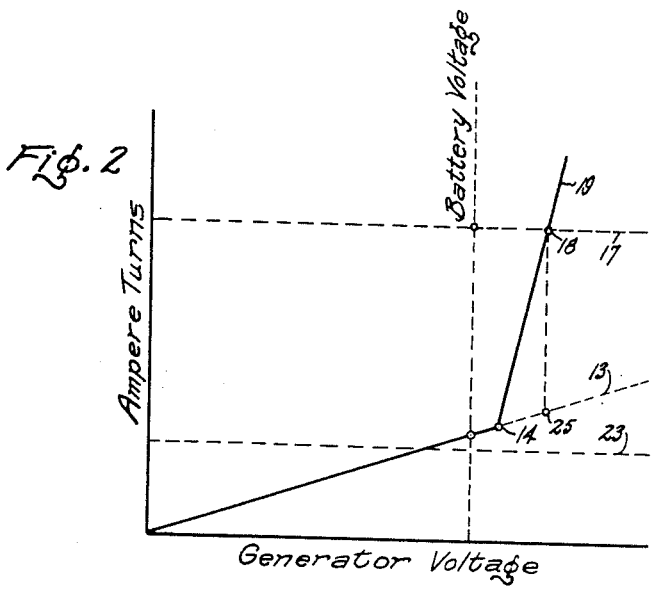
Fig. 2 is an explanatory voltage ampere turn curve used with Fig. 1.

This is more clearly shown by Fig. 2 which is a plot of the ampere turns of the relay coils on the vertical axis against the generator voltage on the horizontal axis with the contact 3 open. The vertical dotted line of Fig. 2 represents the fixed voltage of the battery 2 and is shown as a line extending from some point on the generator voltage axis. The ampere turns through the coil windings are represented by the solid black curves of the drawing. Line 13 represents the line the ampere turns will follow when resistor 8 is the only effective resistance in series with the source 1 and the coils 5 and 6. At some point 14 the current will start to flow through the rectifier 12 into the battery 2 and the slope of the ampere turn curve will be increased. As soon as the ampere turns curve reaches the relay energization setting shown as the horizontal dotted line 17, the relay 4 is adjusted to close contact 3. This is shown at point 18 on the curve. Assuming the impedance of the circuit of the battery 2, the coils 5 and 6 and the rectifier 12 is linear, the line 19 will be a straight line, the slope of which depends on this impedance in parallel with resistor 8. Since the horizontal position of the steep portion of the curve 19 is determined by the existing battery voltage, a differential action is obtained similar to that usually provided by a differential coil. This causes the difference between the generator voltage and the battery at the relay pickup point to vary only slightly over a wide range of battery voltages. Hence, a wide degree of accuracy on pickup is inherent in the system.

When the relay 4 picks up, the voltage from the line 20 which is connected to the current tap 21 between the two coils, is connected through contact 3 to the positive terminal of the battery and load by line 22. Since the voltage of the source 1 is higher than the voltage of the battery 2, this causes a large surge of charging current to flow from the source to the battery through coil 5. Simultaneously, rectifier 12 ceases to conduct and the ampere turns of coil 6 decrease to a value indicated by point 25 on line 13. A surge of charging current through the coil 5 prevents the relay from dropping out due to the sudden decrease in the ampere turns of coil 6; thus, the relay will not pump on closing. As long as the load current is flowing from the source, the series coil 5 and the potential coil 6 are so wound as to aid each other in holding the relay 4 closed. When the source voltage drops below the battery voltage and reverse current flows from the battery 2 through series coil 5 to the source 1, the reverse ampere turns of series coil 5 cancel some of the potential coil 6 ampere turns, lowering the net excitation of the relay. When the net ampere turn level is decreased to the deenergization point of the relay represented by the horizontal dotted line 23 of Fig. 2, the relay drops out, opening contact 3. At this point the source voltage is less than the battery voltage and the relay cannot reclose. This condition prevents the relay from pumping on deenergization.

Should the source 1 be operated to produce a reverse voltage, the rectifier 12 would not conduct at any time. The result would be, as shown in Fig. 2, that the ampere turn line would follow line 13 without having a steep portion as shown by 19. The source is so arranged that it will not ordinarily produce a voltage great enough to energize the relay under these conditions. The slope of line 13 is inversely proportional to the resistance 8. If there is any danger of the relay energizing under reverse voltage, the resistance 8 may be increased until this danger is eliminated.

Figure 3:
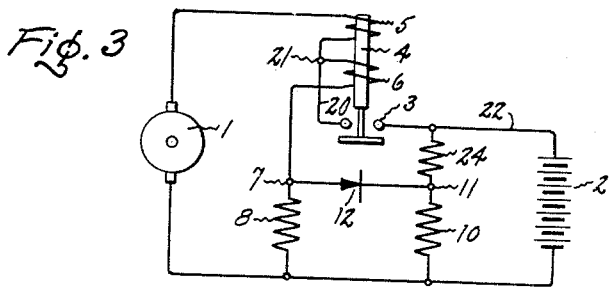
Fig. 3 illustrates another embodiment of this invention.

A further refinement is shown in Fig. 3 by the addition of a potentiometer and shunt across battery 2 consisting of resistor 24 and resistor 10. The rectifier 12 is connected to voltage tap shown as point 11 which is the junction between these two resistors. Since the voltage of point 11 is less than the full battery voltage, it is obvious that rectifier 12 will begin to conduct when point 7 is less than full battery voltage. Referring to Fig. 2, this means that point 14 moves to the left on curve 13. By proper choice the resistors 10 and 24 can be so proportioned that rectifier 12 will begin to conduct when the source voltage is exactly equal to the battery voltage. This results in a decreased differential between source voltage and battery voltage at the pickup point of relay 4. This refinement is of particular interest where a high resistance potential coil 6 must be used with a consequent high voltage differential at the energizing point.

Figure 4:
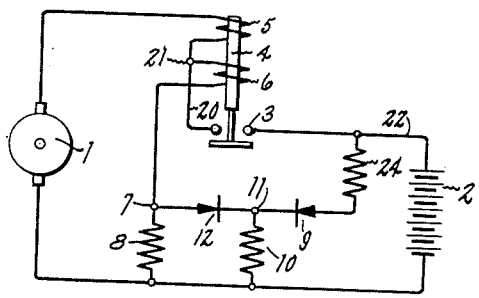
Fig. 4 illustrates another embodiment of this invention.
Figure 5:
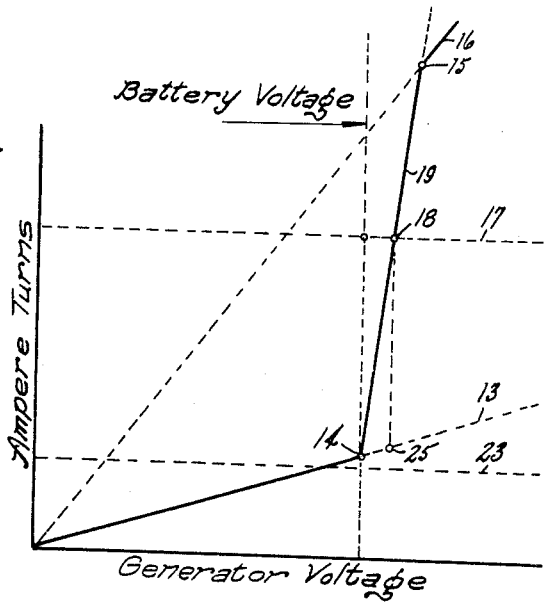
Fig. 5 is an explanatory voltage ampere curve used with Fig. 4.

A still further refinement is shown in Fig. 4 by the addition of a rectifier 9 between the resistor 24 and the point 11. Resistor 24 may be negligible so that the voltage drop between the tap 11 and line 22 is due entirely to the impedance of the rectifier 9. Resistors 24 and 10 are so proportioned that rectifier 9 will be conducting at all times until after the pickup value of ampere turns in coil 6 is reached. Therefore, under normal operating conditions, rectifier 9 has no effect on the operation of the system. However, if the contacts 3 should fail to close, and the voltage of the source 1 should rise to a value which exceeds the voltage of the battery 2 by a large amount, rectifier 9 will cease to conduct and effectively increase the impedance in series with coil 6. Referring to Fig. 5, the rectifier 9 ceases to conduct at point 15 and the ampere turns of coil 6 increase along the line 16 as the voltage of the source increases further. Thus, in a circuit where a separately operated protective device might prevent the closure of contacts 3, the rectifier 9 would serve to protect coil 6 from over-current.

Figure 6:
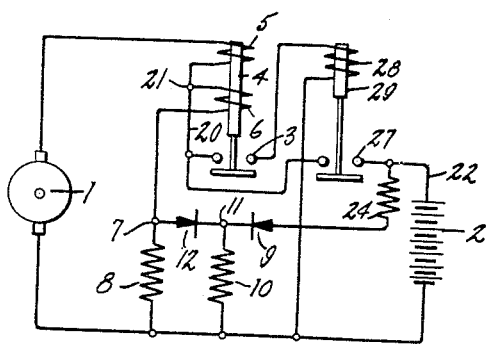
Fig. 6 illustrates another embodiment of this invention.

Fig. 6 shows a modification of Fig. 4 with a heavy duty contact 27 added. The contact 3 is connected in the circuit to activate the high impedance coil 28 of relay 29 causing contact 27 to close. Referring to Fig. 1, should the current through contact 3 be very large when the dropout occurs, arcing of these contacts would cause a gradual erosion of the contact material, thus lessening the contact pressure. This decrease in the contact pressure would cause the dropout point as shown by line 23 of Fig. 2 to be lowered slightly. The additional relay 29 is used to prevent this occurrence and allow sensitivity of the system to continue in heavy duty applications.

It is easily seen that this system results in a reverse current battery charging system that will not tend to pump either on the pickup operation or the dropout operation.

While we have shown and described a particular embodiment of this invention, further modifications and improvements will occur to those skilled in the art. We desire it to be understood, therefore, that this invention is not limited to the form shown and we intend the appended claims to cover all modifications which do not depart from the spirit and scope of this invention.

What we claim as new and desire to secure by Letters Patent of the United States is:

1. A battery charging system comprising a source of current, an electromagnetically operable switch, two coils capable of actuating said switch, an impedance, one of said coils and said impedance being serially connected across said source, a battery, and means positioned between said battery and the junction of said coil and said impedance to provide a current path only when the voltage of said junction is greater than the voltage of said battery whereby the impedance in series with said coils and said source is reduced.

2. A battery charging system comprising a source of current, an electromagnetically operable switch, contacts operated by said switch, two coils capable of actuating said switch, an impedance, one of said coils and said impedance being serially connected across said source, a battery, the other of said coils, said battery and said contacts serially connected across said source, and means positioned between said battery and the junction of said coil and said impedance to provide a current path only when the voltage of said junction is greater than the voltage of said battery whereby the impedance in series with said coils and said source is reduced.

3. A reverse current protective system comprising a source of current, an electromagnetically operable switch, contacts operated by said switch, two coils capable of actuating said switch, an impedance, one of said coils and said impedance being serially connected across said source, a battery, the other of said coils, said battery and said contacts being serially connected across the said source, said coils connected to produce opposing flux when current is flowing from said battery to said source, and means positioned between said battery and the junction of said coil and said impedance to provide a current path only when the voltage of said junction is greater than the voltage of said battery whereby the impedance in series with said coils and said source is reduced.

4. A battery charging system comprising a source of current, an electromagnetically operable switch, two coils capable of actuating said switch, an impedance, said coils and said impedance being serially connected across said source, a battery, a potentiometer connected across said battery, said potentiometer having a voltage tap, and means positioned between said tap and the junction of said coil and said impedance to provide a current path only when the voltage of said junction is greater than the voltage of said tap whereby the impedance in series with said coils and said source is reduced.

5. A battery charging system comprising an electromagnetic source of direct current, a relay having two serially connected actuating coils, a resistance, said coils and said resistance serially connected across said source, a battery, a potentiometer having a voltage tap thereon and being connected across said battery, and unidirectional conductor means positioned between said tap and the junction of said coils and said resistance to reduce the impedance of said series circuit by providing a second current path between said coils and source only when the voltage of said junction is greater than the voltage of said tap.

6. A battery charging system comprising an electromagnetic source of direct current, a relay having two serially connected coils with a current tap therebetween, an impedance, said coils and said impedance serially connected across said source, a battery, a unidirectional potentiometer connected across said battery, said potentiometer having a voltage tap thereon, switch means having a pair of terminals short circuited in response to current in said relay coils, one of said terminals connected to said current tap and the other of said terminals connected to said battery so that said battery may be connected across said source for charging from said source, and means for connecting said voltage tap to the junction between said coils and said resistance when the voltage of said junction is greater than the voltage of said voltage tap whereby the impedance in series with said coils and said source is effectively reduced.

7. A battery charging system comprising an electromatic source of direct current, two serially connected coils with a current tap therebetween, a first resistance, said coils and said first resistance serially connected across said source, a battery, a switch having a pair of terminals short circuited in response to current in said coils to serially connect said battery and one of said coils across said source, a unidirectional conductor means, a voltage tap, a second resistance, said unidirectional means, said voltage tap, and said second resistance being serially connected across said battery, and means positioned between said voltage tap and the junction of said coils and said resistance to provide a current path only when the voltage of said junction is greater than the voltage of said voltage tap whereby the impedance in series with said coils is reduced.

8. A battery charging system comprising a variable voltage electromagnetic source of direct current, two serially connected coils, a current tap between said coils, a first resistance, said coils and said first resistance serially connected across said source, a battery, switch means having a pair of terminals short circuited in response to current in said coils, one of said terminals electrically connected to said current tap and the other of said terminals connected to said battery, so that said battery and one of said coils may be serially connected across said source for charging, a rectifier means, a voltage tap, a second resistance, said rectifier, voltage tap and said second resistance being serially connected across said battery, and another rectifier positioned between said voltage tap and the junction of said coils and said first resistance to provide a current path therebetween only when the voltage of said junction is greater than the voltage of said voltage tap whereby the impedance in series with said coils is reduced.

9. A battery charging system comprising a source of direct current, two serially connected coils with a current tap therebetween, a first impedance, said coils and said impedance serially connected across said source, a battery having two terminals, an electromagnetically operable switch means having a pair of terminals short circuited in response to current in said coils, one of said switch terminals electrically connected to said current tap and the other of said switch terminals electrically connected to one of said battery terminals so that when said switch means is short circuited said battery will be connected across said source in series with one of said coils, a rectifier means, a voltage tap, a second impedance, a third impedance, said rectifier means, said voltage tap, said second impedance and said third impedance serially connected across said battery, said rectifier means connected to conduct current from one of said battery terminals toward the other of said battery terminals only when the voltage across said battery exceeds the voltage across said third impedance, another rectifier connected between said voltage tap and junction of said coils and said first impedance to reduce the impedance of the series circuit of said coils by providing a second current path between said junction and said source only when the voltage of said junction is greater than the voltage across said third impedance.

10. A battery charging system comprising a source of direct current, a first relay having a series coil and a potential coil serially connected, a current tap between said coils, a first impedance, said coils and said first impedance being serially connected across said source, a second relay having a high impedance coil, a first switch means having a pair of terminals short circuited in response to energization of said first relay, one of said terminals connected to said current tap and the other of said terminals connected to said high impedance coil for connecting said high impedance coil across said source in response to short circuit of said terminals, a battery having two terminals, a second switch means having a pair of terminals short circuited in response to the energization of said second relay, one of said terminals of said second switch means connected to said current tap and the other of said terminals of said second switch means connected to one of said battery terminals for serially connecting said battery and said series coil across said source in response to short circuit of said terminals of said second switch means, a unidirectional potentiometer means having a voltage tap thereon, said potentiometer connected across the terminals of said battery to conduct battery current only when the voltage of said battery exceeds the voltage of said tap, and unidirectional conductor means positioned between said voltage tap and the junction of said coils and said first impedance to reduce the impedance of the series circuit of said first relay coil by providing a second current path between said junction and source only when the voltage of said junction is greater than the voltage of said voltage tap.

11. A battery charging system comprising a source of direct current, two serially connected coils, an impedance, said coils and said impedance serially connected across said source, a battery, a potentiometer connected across said battery, said potentiometer having a voltage tap thereon, a first unidirectional conductor means serially connected with said battery and said potentiometer for preventing charging of said battery from said voltage tap, a second unidirectional conductor means positioned between said tap and the junction of said coils and said impedance to provide a current path only when the voltage of said junction is of the same polarity and greater than the voltage of said voltage tap whereby the impedance in series with said coils is reduced.

12. A battery charging system comprising a source of direct current, a series coil, a potential coil, a current tap between said coils, an impedance, said coils and said impedance serially connected across said source, a battery, switch means having a pair of terminals operable in response to current in said coils, one of said terminals connected to said current tap and the other of said terminals connected to said battery so that said battery and said series coil may be serially connected across said source, said coils connected to produce aiding flux when current is flowing from said source through said coils and opposing flux when current is flowing from said battery through said source, a unidirectional potentiometer means connected across said battery, said potentiometer means having a voltage tap thereon, means positioned between said voltage tap and the junction of said coils and said impedance to reduce the impedance of said series circuit by providing a second current path between said coils and said source only when the voltage of said junction is of the same polarity and greater than the voltage of said tap.

13. In combination, a source of direct current, a relay having a series winding and a potential winding, a first resistor in series with said windings, first unidirectional conducting means in parallel with said first resistor, a load including a battery, other unidirectional conducting means shunting said battery, a second resistor connected in series with both of conducting means to receive current from them when they are conductive, means for preventing energization of said relay until said first unidirectional conducting means is conductive, and means for preventing deenergization of said relay until said series coil carries a reverse current of a predetermined amount.

References Cited in the file of this patent

UNITED STATES PATENTS

| Number | Name | Date |
|---|---|---|
| 926,164 | Bliss | June 29, 1909 |
| 1,147,696 | Woodridge | July 20, 1915 |
| 1,149,735 | Creveling | Aug. 10, 1915 |
| 1,298,464 | Creveling | Mar. 25, 1919 |
| 1,348,098 | Eisenmann | July 27, 1920 |
| 1,469,736 | Sullivan | Oct. 2, 1923 |
| 1,920,096 | McNeil | July 25, 1933 |
| 1,973,804 | Frese | Sept. 18, 1934 |
| 1,993,070 | Middleton | Mar. 5, 1935 |
| 2,067,420 | Seeger et al. | Jan. 12, 1943 |
| 2,332,951 | Thompson | Oct. 26, 1943 |
| 2,606,313 | Bell | Aug. 5, 1952 |

FOREIGN PATENTS

| Number | Country | Date |
|---|---|---|
| 847,864 | France | July 10, 1939 |